United States Patent [19]
Constant

[11] 3,896,435
[45] July 22, 1975

[54] SIMPLE RADAR FOR DETECTING THE PRESENCE, RANGE AND SPEED OF TARGETS

[76] Inventor: James Nickolas Constant, 1603 Danbury Dr., Claremont, Calif. 91711

[22] Filed: June 21, 1973

[21] Appl. No.: 372,397

Related U.S. Application Data
[63] Continuation-in-part of Ser. No. 235,084, March 3, 1972, abandoned.

[52] U.S. Cl. .................. 343/9; 343/5 PD; 343/5 R
[51] Int. Cl. ............................................. G01s 9/44
[58] Field of Search............ 343/5 PD, 5 R, 17.1, 8, 343/7.7, 17.1 PF, 9; 340/16 R

[56] References Cited
UNITED STATES PATENTS
3,065,455  11/1962  Roth ................................. 340/16 R
3,659,293  4/1972  Gupta .................................. 343/14
3,725,854  4/1973  Otsuka .............................. 343/5 PD
3,766,554  10/1973  Tresselt .................................. 343/9

OTHER PUBLICATIONS
M.I. Skolnik, *Intro. to Radar Systems*, McGraw–Hill, 1962, Sec. 8–2, p. 359.

Primary Examiner—Maynard R. Wilbur
Assistant Examiner—G. E. Montone
Attorney, Agent, or Firm—Harris, Kern, Wallen & Tinsley

[57] ABSTRACT

A simple radar for detecting the presence, range and speed of a target and having a single solid state device for producing bias and doppler signals and having a signal processor for converting these signals to signals which represent the presence, range and speed of the target.

27 Claims, 3 Drawing Figures

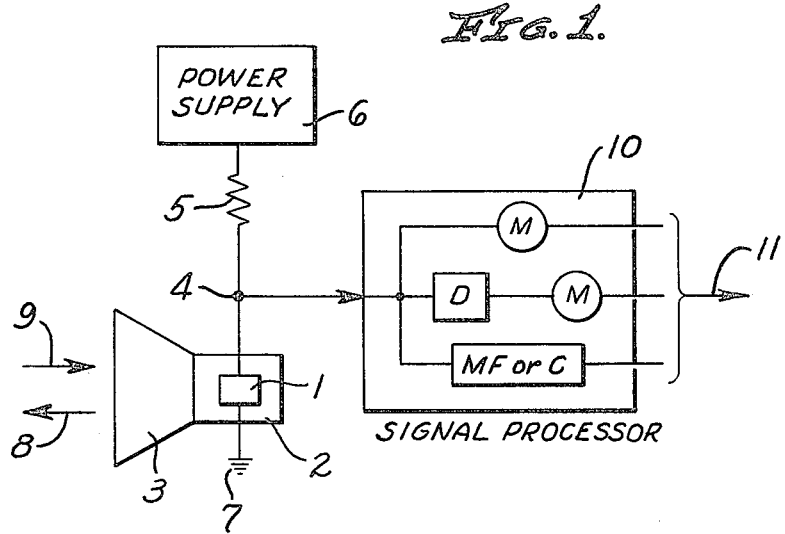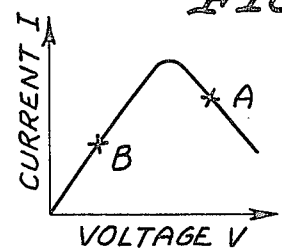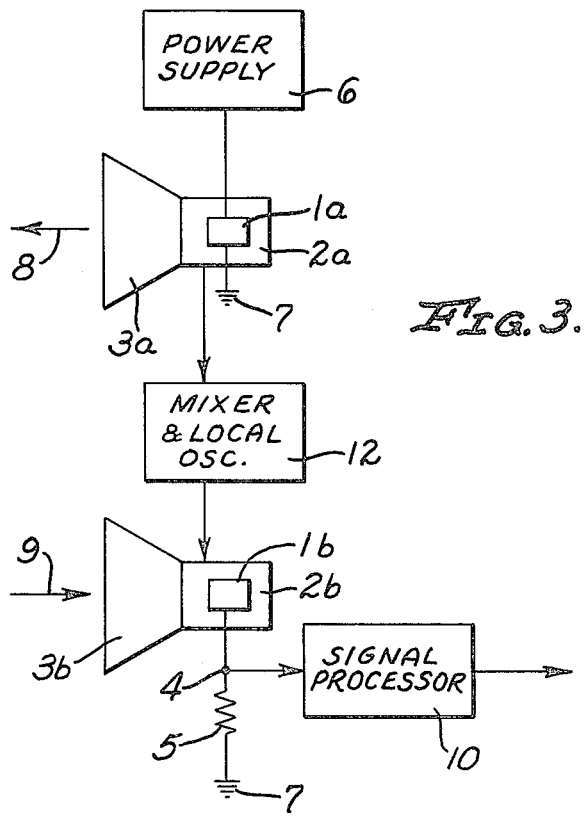

SIMPLE RADAR FOR DETECTING THE PRESENCE, RANGE AND SPEED OF TARGETS

This application is a continuation-in-part of my co-pending application Ser. No. 235,084, filed Mar. 3, 1972, now abandoned.

BACKGROUND OF THE INVENTION

Conventional pulse, doppler and pulse doppler radars measure either or both the range and speed of targets. These systems are often quite complex and costly and cannot be used in a number of applications which require simple, inexpensive presence detectors, range, speed and combined range-speed meters. The recent advent however of solid state oscillators has decreased the complexity and cost of these systems and thus paved the way for their use in a wider spectrum of applications. Simple nonranging doppler radars are known in the art wherein only a single solid state device is used to generate and simultaneously mix acoustic or electromagnetic energy so as to obtain a doppler signal representative of relative speed of a target, for example see U.S. Pat. Nos. to Otsuka 3,725,854; Howard 3,710,385; Bloice 3,691,556; Stephens 3,383,682; and Klein 3,688,703. These radars however are unsuitable for use in a number of applications which require the mere detection of the presence of a target, for example in intruder alarms or in antihijacking gun detectors, or ranging, for example in collision avoidance systems. Presence detectors based on simple nonranging doppler radar are unduly complex and costly by their use of doppler filters and receivers for obtaining the presence of targets. Thus non-ranging doppler radar systems of the prior art which measure the presence of a target are constrained by the complexity and cost of their receivers and therefore remain complex and uneconomical to use and mass produce in a variety of applications such as in intruder alarms and in antihijacking gun detector systems. On the other hand, ranging radars based on simple doppler radar are also complex and costly by their use of modulators for obtaining target range. Ranging techniques for doppler radars utilizing separate generators and mixers are well known, for example see Boyer "A Diplex, Doppler Phase Comparison Radar" IEEE Transactions on Aerospace and Navigational Electronics, pp 27–33, March, 1963. These systems of course are complex and costly and thus prohibitive for both their use and mass consumption in a variety of ranging applications, for example in aircraft, automotive, and blind-person collision avoidance systems. A partial simplification and cost reduction of these systems has been achieved utilizing the single solid state device approach of simple nonranging doppler radars, see for example U.S. Pat. Nos. to Gupta 3,659,293 and Tresselt 3,766,554. Unfortunately however even these systems, although having indeed reduced both the complexity and cost of ranging doppler radars, have fallen short of achieving desired goals of simplicity and economy being constrained in doing so by the need to modulate their generators for obtaining the target range. Thus doppler radar systems of the prior art which measure range are constrained by the complexity and cost of having modulators and therefore remain complex and expensive items to use and mass produce in a variety of ranging applications such as in aircraft and vehicular collision avoidance systems, traffic control systems, radar for the blind, etc.

SUMMARY OF THE INVENTION

The present invention provides a simple radar utilizing a single solid state device and signal processor which are not complex, which use inexpensive components, and may be economically manufactured. when used as a presence or range rate detector the invention does not require the use of a doppler filter or receiver while when used as a range-detecting radar the invention does not require the modulation of its transmission for the ranging of targets. The radar in accordance with the present invention is functionally and economically suitable for use and mass production in presence sensing and collision avoidance systems.

Whereas in the prior art the target presence, range and speed are determined using means for processing the doppler signal, the system of the present invention determines these same parameters using means for processing the bias signal, or alternatively, using combined means for processing both the bias signal, or alternatively, using combined means for processing both the bias and doppler signals.

More specifically, by way of example, the present invention includes a single solid state device, such as a diode, Gunn diode, avalanche or tunnel diode, transistor, etc., commonly known in the trade as TEDs(transferred-electron devices), IMPATTS(impact avalanche and transit time diodes), TRAPATTS(trapped plasma avalanche triggered transit diodes), and BARRITTS(barrier injected transit time diodes), which is adapted for electrical oscillation at microwave frequencies to launch its transmission towards a target, and is further adapted to receive microwave energy reflected from the target; to obtain both bias and doppler components of the signal. According to this invention target range is obtained using the bias portion of the signal while target speed is obtained by the simple expedient of differentiating target range. Alternatively, target speed may be obtained in the conventional manner using the doppler portion of the signal. A signal processor is included having as its input the two components of the signal, bias and doppler, and may be used to provide the target presence, range and speed at its output.

Various microwave solid state devices suitable for use in the present invention are described in the article by H. Sobol and F. Sterzer "Microwave Power Sources" appearing in the April, 1972 issue of IEEE Spectrum, and in the article by E. Torrero "Active diode crowding Gunns in noise, power, and efficiency" appearing in the Apr. 1, 1973 issue of Electronic Design.

In view of the foregoing description, the simplicity of construction and minimal cost of a presence detector or range detecting doppler radar in accordance with the present invention will be apparent. As a result, a presence detecting radar or a range-detecting doppler radar may be produced which is simple in construction and economically suitable for use and mass consumption in a wide variety of applications, for example in intruder alarms, antihijacking gun detectors, aircraft and vehicular collision avoidance systems, etc. Accordingly, the present invention may result in a significant reduction of crime, and traffic related injuries and fatalities. This invention is believed to be a significant advance in the state of the art.

It is therefore an object of this invention to provide a simple radar system which can be used as a detector for the presence, range, or speed, or any combination of these parameters, of targets. Another object of this invention is to provide a simple radar system which can be used as a target size detector. Other objects, advantages, features and results will more fully appear in the course of the following description. The drawing merely shows and the description merely describes a preferred embodiment of the present invention in the microwave portion of the electromagnetic spectrum and is given by way of illustration or example.

BRIEF DESCRIPTION OF THE DRAWING

FIG. 1 is a block diagram of a radar system using a single solid state device to provide a common generator-mixer-detector-antenna for use as a presence, range and speed detector and incorporating the presently preferred embodiment of the invention.

FIG. 2 is a voltage-current characteristic of a typical diode device utilized in the present invention.

FIG. 3 is a block diagram similar to that of FIG. 1 showing a dual antenna configuration of the radar systems.

DESCRIPTION OF THE PREFERRED EMBODIMENTS

In order to describe the system, reference is made to FIG. 1. A Gunn oscillator 1 is mounted in a short oscillator-cavity 2 which in turn is coupled to an antenna 3, shown as a horn. A voltage is supplied to the Gunn oscillator 1 at point 4 through resistor 5, which enables the system to operate from a 12 V power supply 6. The Gunn oscillator 1 is grounded at 7. Items 1–7 constitute the radar transmitter.

For a typical device, the voltage and current at point 4 are 7V and 140 milliamps, respectively, and the resistor 5 required is therefore 36 ohms. The power supply 6 may be fixed stabilized in which case the resistor 5 is a variable preset resistor, or, may be a variable stabilized supply used when resistor 5 is a fixed resistor. A screened cable is used to connect the Gunn oscillator to the bias resistor 5 and power supply 6.

The operation of a radar as a self-oscillator-mixer using a common antenna is given in the foregoing references by Otsuka, Howard, Bloice, Stephens, Klein, Gupta, Tresselt and in the article by M. Lazarus et al "New Millimeter Wave Receivers Using Self-Oscillating Gunn Diode Mixers" appearing in the July 1971 issue of Microwave Journal.

In operation, the Gunn oscillator 1 oscillates in the high-Q oscillator-cavity 2 to launch the carrier signal 8 via the antenna 3 to the vicinity of a target. Although not necessary or needed, according to the system of the present invention, the carrier signal may be modulated in any number of ways in a conventional manner. The received signal 9 returns from the target via the same path to the Gunn oscillator 1 which operates as a self oscillating mixer, thus bypassing the problem of isolation of conventional systems while at the same time simplifying the RF circuit.

The mixed or detected signal appears across resistor 5 as an input to a signal processor 10. Items 1–7 constitute the radar receiver. Thus items 1–7 are therefor common to both the transmitter and receiver.

The transmitter produces a frequency which is located preferably in the radar, optical, or acoustic portions of the electromagnetic frequency spectrum, FIG. 1 illustrating merely the case for the radar spectrum.

The frequency of the transmitter is preferably fixed and coherent. The exact frequency used in any case is determined by the application at hand. Any of the well known types of components 1–7 constituting the transmitter and receiver and capable of producing oscillations and signal mixings at the needed frequencies may be utilized. The receiver has a bandwidth which passes the shortest pulse or widest modulation bandwidth encountered in the system. The exact bandwidth in any one case is determined by the application at hand. Any of all the well known types of components 1–7 capable of providing the needed bandwidth may be utilized. The signal processor 10 has a transfer function which is determined by the application at hand and is used to process the bias signal or combined bias and doppler signals. Any of the well known types of voltmeter or ammeter M matched filters MF or correlators C may be utilized. The system output is available at 11 and normally represents typical metric or signature parameters of interest such as range, range rate, amplitude, etc.

The detected signal at the input point 4 to the signal processor 10 constitutes both the signal doppler and the signal bias. The latter effect is particularly noticeable when using the Gunn diode 1 as a mixer and its level is uniquely determined by the diode characteristic and by the target size and range. The signal bias may therefore be employed to determine the target size and range without recourse to modulating Gunn Oscillator 1. Thus, in addition to the size, weight, cost, and performance improvements obtained by using common components for the transmitter and receiver, the system of the present invention provides additonal improvements in these quantities by virtue of its inherent capability to size and range targets without using modulators. Typical solid state devices such as Gunn diodes, tunnel diodes, avalanche diodes, etc., can be used in the oscillator in lieu of a Gunn diode, such devices have well known voltage-current characteristics which may exhibit positive, negative, or even zero resistance slopes over selected portions of their range of operation. This all can be seen in any reliable book on such devices, for example in the Gunn Diode Circuit Handbook by Microwave Associates/HB-9000/Feb. 1971. The detection of a microwave signal by such devices provides two signal components; signal bias by the detection process and signal doppler by target motion. Both portions of the signal are determined by the exact diode characteristic employed, i.e., by its resistance slope. The proper selection of the diode voltage-current characteristic and operating range permits therefore the calibration for and subsequent detection of target range for targets of known size or, alternatively, the calibration for and subsequent detection of target size at known range.

When a signal is detected in a diode or in a diode mixer, it produces a dc bias and ac components. See for example the discussion in connection with FIG. 8.2 and on page 431 in the book by Skolnik "Introduction to Radar Systems" McGraw Hill 1962. The signal which is detected in a radar receiver consists of a dc bias and ac signal CW or doppler as the case may be. The dc bias comes about by the non-linear or rectifying action of the diode which having an ac signal predicted by the radar equation impressed at its input, produces a dc bias and ac at its output. As shown by Skolnik in his FIG. 8.2, a blocking capacitor is needed to prevent the dc bias from entering the ac video amplifier. Thus although a dc bias is inherent to any radar which employs a non-linear detector, it is commonly and routinely removed in the prior art by using a blocking capacitor.

All active two terminal solid state oscillators are negative resistance devices. The real part of their impedance is negative over a range of frequencies. On the other hand passive devices such as diodes, rectifiers, detectors, and mixers are positive resistance devices.

In a positive resistance, the current through the resistance and the voltage across it are in phase. A current I flowing through a positive resistance R will produce a voltage drop V=IR, and a power $P_{DISS}=I^2R$ will be dissipated in the resistance. In a negative resistance, however, the current and voltage are 180° out of phase and a current I flowing through a negative resistance -R will produce a voltage rise V=-IR, and a power $P_{GEN}=I^2R$ will be generated by the power supply associated with the negative resistance. Positive resistances therefore absorb power (passive devices) whereas negative resistances generate power (active devices).

A radar system essentially consists of a negative resistance (a transmitter), a positive resistance (a receiver), and a processor. A radar can be implemented having either separate transmitter and receiver and separate antennas (the conventional way) or with a common transmitter-receiver (using a single oscillator-mixer) and common antenna. The present invention is no exception to this procedure and it too can be implemented either way although the reduction in size, weight, and cost is considerable if the conventional dual antenna configuration of FIG. 3 is replaced by the single oscillator-mixer common-antenna configuration of FIG. 1. The single oscillator-mixer common-antenna system is therefore a preferable configuration of the present invention. In either case, the radar operates in a predictable manner.

Shown in FIG. 2 is a typical voltage-current characteristic of a diode, for example that given in FIG. 1 of the foregoing Microwave ASsociates reference. If the diode is operated at point A (negative resistance) it oscillates energy, i.e., it becomes a transmitter at its frequency of operation $$\frac{\omega}{2\pi}.$$

If the diode is operated at point B (positive resistance) it dissipates energy, i.e., it becomes a receiver at the received frequency $$\frac{\omega + \omega_o}{2\pi}$$

which includes the transmitter frequency and the doppler frequency. Of course, the desired transmitter-receiver characteristic can be obtained by using separate diodes as shown in FIG. 3 or by using a single diode as shown in FIG. 1.

In conventional mixer theory for passive rectifier diodes, one assumes that the conductance G for the incoming signal to a receiver can be expanded as a Fourier Series in harmonics of the local oscillator frequency $$\frac{\omega_L}{2\pi}.$$

i.e., if $V=V_o \cos(\omega+\omega_D)t$ is the received signal voltage, the crystal current I is given by $$I = VG$$
$$= V(G_o + \sum_{n=1}^{\alpha} G_n \cos \eta \, \omega_L \, t) \quad (1)$$

which of course gives the component of current at intermediate frequencies $$\frac{\omega + \omega_o - \eta\omega_L}{2\pi}$$

to be $$\frac{V_o G_n}{2} \cos(\omega + \omega_D - \eta\omega_L)t.$$

Thus, the IF output voltage of a receiver (positive resistance) conveys doppler information as is well known and appreciated. Less appreciated however is the equally important fact that the output is proportional to $V_o$, i.e., the electric field amplitude of the received input signal. This latter fact holds whether the target is stationary or moving, i.e., doppler is present or not, and is utilized in the system of the present invention.

Up to this point, the description of radar in the prior art and the radar of the present invention is identical. In particular, either type radar can be implemented having separate transmitter and receiver and separate antennas or having a common transmitter-receiver and common antenna. Their receivers can be implemented using fundamental ($n=1$) or harmonic (n1) mixing. In either case, the size and cost can be reduced significantly by using a common transmitter-receiver and common antenna, and this is the preferred embodiment of the present invention.

The distinguishing feature between the prior art and the system of the present invention is that while in the former the signal processor 10 includes means for processing the doppler signal $\omega_D$ and specifically excludes means for processing the bias signal $V_o$, the latter includes means for processing the bias signal $V_o$ or combined means for processing both the bias signal $V_o$ and doppler signal $\omega_D$. Thus, the prior art determines the presence, range, and speed of targets using means for processing the doppler signal, while the system of the present invention determines these same parameters using means for processing the bias signal or using combined means for processing the bias and doppler signals.

An example of a radar with separate transmitter 1a, 2a and receiver 1b, 2b and separate transmitter antenna 3a and receiver antenna 3b is shown in FIG. 3, where components corresponding to those of FIG. 1 are identified by the same reference numerals. The transmitter and receiver may be separated by a mixer-local oscillator 12 for providing an IF frequency if desired. The radar of FIG. 3 is operated in the same manner as the radar of FIG. 1.

As an example of the use of the present invention, the detection of a signal from a target by diode 1 provides two signal components at the input 4 to signal processor 10; the signal bias $V_o$ and the signal doppler $\omega_D$. Either signal component can be used to determine the target presence, range or speed; the system of the present invention uses the signal bias while the prior art uses the signal doppler. Thus in the present invention, the signal processor 10 can be implemented simply as a voltmeter or ammeter M which detects the signal bias in either a presence detector or ranging and speed applications. In the latter application, the voltmeter or ammeter scale can be easily converted to a range scale knowing the voltage-current characteristic of diode 1 and the target size. Alternatively in target sizing applications, the voltmeter or ammeter scale can be easily converted to a target size scale knowing the diode characteristic and the target range. In ranging doppler applications, the signal processor 10 includes calibrated means for detecting target range and range rate using the bias component of the signal. For target range rate or speed, a differentiating circuit D is used ahead of the meter to differentiate the range signal from point 4. Alternatively, signal processor 10 may include a conventional matched filter, correlator, doppler filter, or receiver for detecting the target range rate using the doppler component of the signal.

The well known radar equation teaches that the bias signal voltage $V_o$, being proportional to the square-root of the power received, is a function of the target size and target range. As mentioned previously, the output voltage of a receiver (positive resistance) is proportional to $V_o$. These two facts permit the simple determination of target presence, range knowing target size, size knowing targer range, and speed using the bias signal alone or using the bias signal in combination with the doppler signal. A presence detector results if the voltage-current characteristic is left uncalibrated, in which case a reading by the voltmeter or ammeter indicates target presence. A range detector results if the voltage-current characteristic is calibrated as a range scale for a known target size, in which case the voltmeter or ammeter indicates target range. A size detector results if the voltage current characteristic is calibrated as a size scale for a target at known range, in which case the voltmeter or ammeter indicates target size. Finally, a speed detector results if the voltage-current characteristic is calibrated as a speed scale, in which case the voltmeter or ammeter indicates target speed. The case for target speed requires differentiating the detected bias signal at 4 and then applying the differentiated bias signal to the voltmeter or ammeter. Thus signal processor 10 when including conventional means such as a voltmeter, ammeter or differentiating circuit, determines the presence, range (or size), and speed of targets using bias signal $V_o$. Alternatively signal processor 10 may include a voltmeter, ammeter, differentiating circuit, matched filter or correlator for determining these parameter using both the bias signal $V_o$ and doppler signal $\omega_D$. For example, signal processor 10 may use a voltmeter calibrated for range to determine target range and a doppler filter to determine target speed.

The radar equation is discussed in detail at pages 3–5, 20–70 of the book by Skolnik "Introduction to Radar Systems" McGraw-Hill, 1962.

In the foregoing, the term "calibration" is used to denote obtaining a-priori the voltage-current characteristic of FIG. 2 in terms of the particular parameters of interest, i.e., presence, range, size, speed, in a given application. For example, calibration for range involves the placement of a target of known size at various ranges from antenna 3 and reading a voltmeter placed at 4. The resulting voltage-range relationship is the calibration for range and permits the subsequent determination of range for a target of known size.

It should be understood that the common transmitter-receiver-antenna, and doppler features of the present disclosure are conventional means and are neither necessary nor needed for the detection of target presence, range and speed using the bias signal method of the present invention. These features illustrate a preferred embodiment of the invention by way of example.

I claim:

1. A radar system for determining target characteristics and comprising a transmitter, receiver, signal processor, and power supply, said transmitter including oscillator and transmitting antenna, with said oscillator providing the carrier frequency for the transmission of energy, with said transmitting antenna for launching said carrier frequency to the vicinity of a target, said receiver including receiving antenna and mixer, with said mixer for mixing said received signals with a portion of said carrier frequency and providing a mixer output having a doppler component and a bias component, said signal processor having the mixer output as its input and providing a first output varying as a function of the bias component of the mixer output, which first output is used to determine target characteristics and said power supply providing the system power.

2. A system according to claim 1 wherein said oscillator operates as a self-mixer being common with said mixer.

3. A system according to claim 1 wherein said signal processor includes a voltmeter.

4. A system according to claim 1 wherein said signal processor includes an ammeter.

5. A system according to claim 1 having a common transmitting and receiving antenna for said transmitter and said receiver.

6. A system according to claim 1 wherein said signal processor includes means providing a second output varying as a function of the doppler component of the mixer output.

7. A system according to claim 1 wherein said signal processor includes means providing an output varying as a function of target range.

8. A system according to claim 1 wherein said signal processor includes means providing an output varying as a function of target speed.

9. A system according to claim 1 wherein said signal processor includes means providing an output varying as a function of target size.

10. A system according to claim 6 wherein said signal processor includes a matched filter.

11. A system according to claim 1 wherein said signal processor includes a correlator.

12. A system according to claim 1 wherein said power supply is a fixed stabilized power supply used in conjunction with a variable preset resistor.

13. A system according to claim 1 wherein said power supply is a variable stabilized supply used in conjunction with a fixed resistor.

14. A system according to claim 2 wherein said self-mixer includes single solid state means operating as an oscillator-mixer.

15. A system according to claim 14 wherein said solid state means is a diode device.

16. A system according to claim 14 wherein said solid state means is a Gunn diode.

17. A system according to claim 14 including a high-Q oscillator-mixer cavity.

18. A system according to claim 14 wherein said solid state means is connected to a fixed power supply through a variable resistor.

19. A system according to claim 14 wherein said solid state means is connected to a variable power supply through a fixed resistor.

20. A system according to claim 14 wherein said solid state means has a positive slope voltage-current characteristic.

21. A system according to claim 14 wherein said solid state means has a zero-slope voltage-current characteristic.

22. A system according to claim 14 wherein said solid state means has a negative slope voltage-current characteristic.

23. A system according to claim 1 wherein said carrier frequency is located in the acoustic portion of the electromagnetic spectrum.

24. A system according to claim 1 wherein said carrier frequency is located in the microwave portion of the electromagnetic spectrum.

25. A system according to claim 1 wherein said carrier frequency is located in the optical portion of the electromagnetic spectrum.

26. A system according to claim 1 wherein said signal processor includes means providing an output indicating presence of a target.

27. A system according to claim 1 having separate trasmitting and receiving antennas for said transmitter and receiver.

* * * * *